US012760757B2

(12) United States Patent
Davis

(10) Patent No.: US 12,760,757 B2
(45) Date of Patent: Oct. 13, 2026

(54) REACTION WASHER

(71) Applicant: Primesource Consulting LLC, Herriman, UT (US)

(72) Inventor: John Davis, Herriman, UT (US)

(73) Assignee: PRIMESOURCE CONSULTING LLC, Herriman, UT (US)

( * ) Notice: Subject to any disclaimer, the term of this patent is extended or adjusted under 35 U.S.C. 154(b) by 195 days.

(21) Appl. No.: 18/954,893

(22) Filed: Nov. 21, 2024

(65) Prior Publication Data

US 2025/0163951 A1 May 22, 2025

Related U.S. Application Data

(60) Provisional application No. 63/601,861, filed on Nov. 22, 2023.

(51) Int. Cl.
*F16B 39/24* (2006.01)
*F16B 23/00* (2006.01)
*F16B 43/02* (2006.01)

(52) U.S. Cl.
CPC .......... *F16B 23/0061* (2013.01); *F16B 43/02* (2013.01)

(58) Field of Classification Search
CPC ...... F16B 23/0061; F16B 43/02; F16B 39/24; F16B 43/002; F16B 39/282
See application file for complete search history.

(56) References Cited

U.S. PATENT DOCUMENTS

| | | | |
|---|---|---|---|
| 453,313 | A | 6/1891 | Frieberg |
| 625,529 | A | 5/1899 | Andress |
| 910,712 | A | 1/1909 | Mccoy |
| 3,263,727 | A | 8/1966 | Herpolsheimer |
| 3,417,802 | A | 12/1968 | Oldenkott |
| 3,759,119 | A | 9/1973 | Wing |
| 4,708,555 | A | 11/1987 | Terry |
| 5,080,545 | A | 1/1992 | McKinlay |
| 5,230,589 | A | 7/1993 | Gillespie |
| 5,318,397 | A | 6/1994 | Junkers |
| 5,341,560 | A | 8/1994 | Junkers |
| 5,499,558 | A | 3/1996 | Junkers |

(Continued)

FOREIGN PATENT DOCUMENTS

| | | | |
|---|---|---|---|
| CN | 208793433 | | 4/2019 |
| DE | 684466 | C | 11/1939 |

(Continued)

OTHER PUBLICATIONS

International Search Report and Written Opinion of the International Searching Authority for PCT/US2023/064646 dated Oct. 23, 2023, 12 pages.

(Continued)

*Primary Examiner* — Amy J. Sterling

(74) *Attorney, Agent, or Firm* — RANKIN, HILL & CLARK LLP

(57) ABSTRACT

A reaction washer includes a main body that defines an inner diameter that slidingly receives an associated threaded element therethrough so as to define a rotation axis. The main body includes a top surface and a bottom surface that face in opposite directions. The reaction washer also includes a first raised friction inducing surface that extends from at least one of the top surface and the bottom surface so as to be nonconcentric with respect to the rotation axis.

20 Claims, 9 Drawing Sheets

(56) References Cited

U.S. PATENT DOCUMENTS

| | | | | |
|---|---|---|---|---|
| 5,538,379 | A | 7/1996 | Junkers | |
| 5,539,970 | A | 7/1996 | Junkers | |
| 5,626,449 | A | 5/1997 | McKinlay | |
| 5,640,749 | A | 6/1997 | Junkers | |
| 5,946,789 | A | 9/1999 | Junkers | |
| 6,152,243 | A | 11/2000 | Junkers | |
| 6,254,323 | B1 | 7/2001 | Junkers | |
| 6,461,093 | B1 | 10/2002 | Junkers | |
| 6,490,952 | B2 | 12/2002 | Junkers | |
| 6,609,868 | B2 | 8/2003 | Junkers | |
| 6,883,401 | B2 | 4/2005 | Junkers | |
| 6,929,439 | B2 | 8/2005 | Junkers | |
| 6,986,298 | B2 | 1/2006 | Junkers | |
| 7,003,862 | B2 | 2/2006 | Junkers | |
| 7,066,053 | B2 | 6/2006 | Junkers | |
| 7,125,213 | B2 | 10/2006 | Junkers | |
| 7,158,902 | B2 | 1/2007 | Damodaran et al. | |
| 7,188,552 | B1 | 3/2007 | Koppenhoefer | |
| 7,207,760 | B2 | 4/2007 | Junkers | |
| 7,261,506 | B2 * | 8/2007 | Smolarek | F16B 39/282<br>411/187 |
| 7,735,397 | B2 | 6/2010 | Junkers | |
| 8,079,795 | B2 | 12/2011 | Junkers | |
| 8,631,724 | B2 | 1/2014 | Miyata | |
| 8,978,232 | B2 | 3/2015 | Junkers | |
| 9,011,060 | B2 | 4/2015 | Hyatt | |
| 10,107,325 | B2 | 10/2018 | Davis et al. | |
| 11,396,902 | B2 * | 7/2022 | Davis | F16B 39/282 |
| 11,534,894 | B2 | 12/2022 | Davis | |
| 11,920,625 | B2 * | 3/2024 | Cattaneo | F16B 39/282 |
| 12,253,104 | B2 * | 3/2025 | Davis | F16B 39/24 |
| 2016/0375563 | A1 | 12/2016 | Junkers et al. | |
| 2017/0021478 | A1 | 1/2017 | Junkers et al. | |
| 2018/0291945 | A1 | 10/2018 | Turner et al. | |
| 2021/0372442 | A1 | 12/2021 | Junkers et al. | |
| 2022/0106976 | A1 | 4/2022 | Seyboldt | |

FOREIGN PATENT DOCUMENTS

| | | | |
|---|---|---|---|
| DE | 2413760 | A1 | 11/1974 |
| EP | 3083146 | B1 | 7/2020 |
| WO | 2015095425 | A2 | 6/2015 |
| WO | 2015100115 | A2 | 7/2015 |
| WO | 2015152728 | A1 | 10/2015 |
| WO | 2020182875 | | 9/2020 |
| WO | 2020256904 | | 12/2020 |

OTHER PUBLICATIONS

International Search Report and Written Opinion of International Searching Authority for PCT/US2024/056893 dated Mar. 4, 2025, 11 pages.

Bolting Systems International (BSI), "The Tomahawk Tool", Operations, Maintenance and Parts Manual, Rev. 1, BD-TOM001-A, 34 pages.

ASTM International, Standard Specification for Hardened Steel Backup and Reaction Washers Inch and Metric Dimensions 1,2; Designation: F3394/F3394M-20, Licensed to Primesource Consulting LLC user, 7 pages.

* cited by examiner

REACTION WASHER

BACKGROUND

A nut or bolt head may be tightened by a tool while transferring the counteracting reaction torque onto a washer beneath that nut or bolt head. This provides for a balanced, localized overall torque transfer that is self-centering and does not require the need to manually oppose the actuation torque or support the tool eccentrically via a reaction member.

A reaction washer transfers the received reaction torque onto a flange beneath. From the flange, the reaction torque is transferred onto a threaded element via which it counteracts the actuation torque. To avoid slipping and effectively transfer the reaction torque onto the flange, reaction washers commonly employ serrations on a bottom (first side) to bite into the flange.

In order for these serrations to bite, a contact force must be induced during initial tightening that is large enough for a given overall contact area of the bottom serrations to penetrate into the flange. Only then, the reaction washer won't slip and spin when the tool starts to apply torque to the nut and/or bolt head while withholding itself via a concentric reaction socket on the reaction washer.

The friction on a top (second side) of the reaction washer top has to be lower than on the reaction washer bottom to prevent the reaction washer to be rotated with the nut instead of biting into the flange during initial manual tightening. Therefore, there exists a need for a reaction washer that maximizes bite on the first side and provides low friction on its top during initial tightening and that secures the nut and/or bolt head after fully tightening it.

As reaction washers are very convenient for tightening and/or loosening nuts and/or bolt heads, there exists a need for a reaction washer that more effectively engages the flange.

SUMMARY

According to an aspect, a reaction washer includes a main body that defines an inner diameter that slidingly receives an associated threaded element therethrough so as to define a rotation axis. The main body includes a top surface and a bottom surface that face in opposite directions. The reaction washer also includes a first raised friction inducing surface that extends from at least one of the top surface and the bottom surface so as to be nonconcentric with respect to the rotation axis.

According to an aspect, a reaction washer includes a main body defining an inner diameter that slidingly receives an associated threaded element therethrough so as to define a rotation axis. The main body includes a top surface and a bottom surface that face in opposite directions along the rotation axis. The reaction washer also includes a first raised friction inducing surface that extends from at least one of the top surface and the bottom surface. The first raised friction inducing surface is disposed in a circular pattern so as to define an inner friction diameter and an outer friction diameter. A radial distance between the inner friction diameter and the rotation axis varies based upon an angular orientation about the rotation axis.

DETAILED DESCRIPTION

Figure 1:
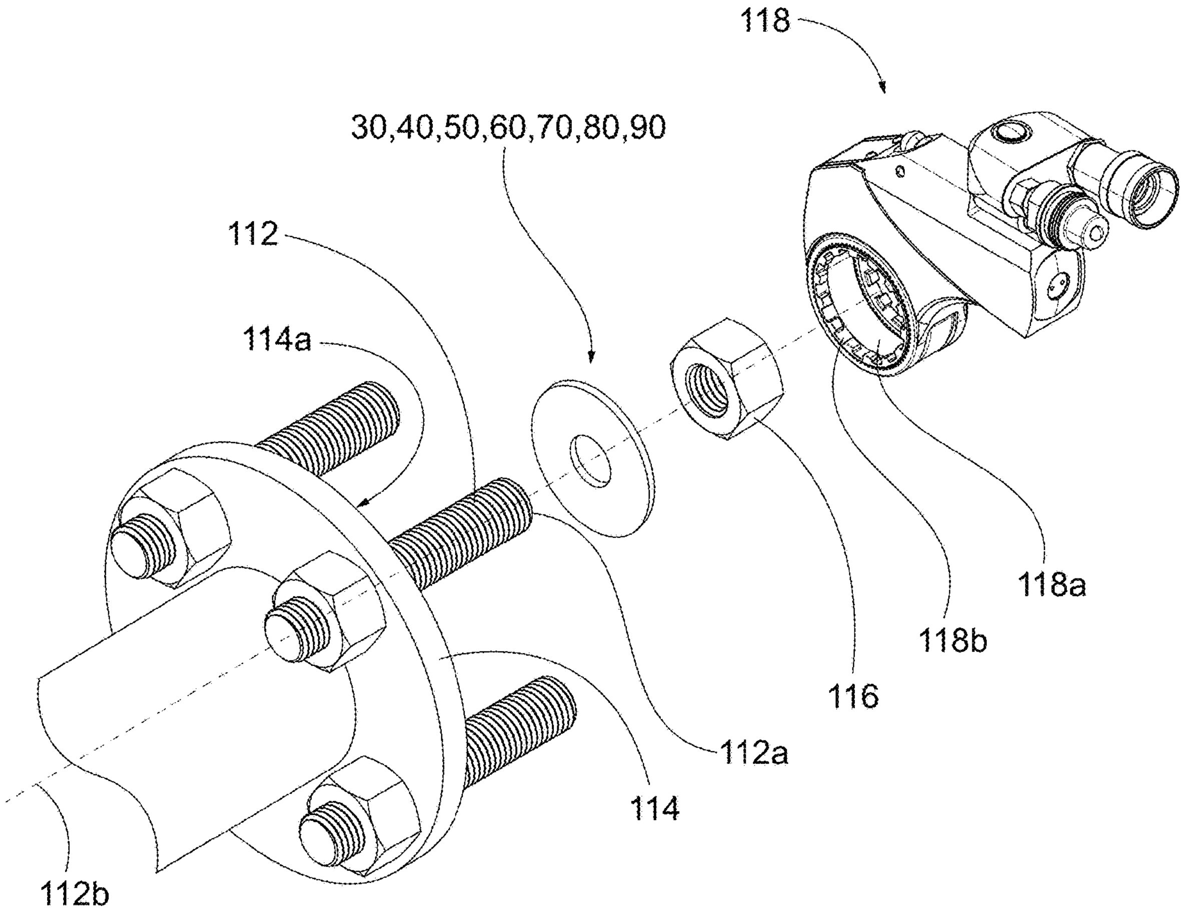
FIG. 1 is a perspective view of a reaction washer in general schematic format in an environmental setting.

It should, of course, be understood that the description and drawings herein are merely illustrative and that various modifications and changes can be made in the structures disclosed without departing from the present disclosure. Referring now to the drawings, wherein like numerals refer to like parts throughout the several views, the figures schematically depict a reaction washer according to the present disclosure.

With reference to FIGS. 1-2, a reaction washer 30, 40, 50, 60, 70, 80, 90 is shown in general schematic format. Further, FIG. 1 illustrates the reaction washer 30, 40, 50, 60, 70, 80, 90 in an operating environment. As will be described in more detail hereinafter, the reaction washer 30, 40, 50, 60, 70, 80, 90 can be in a variety of formats without departing from the scope of the disclosure. Notably, FIGS. 3-9 illustrate the reaction washer 30, 40, 50, 60, 70, 80, 90 in a variety of configurations.

Additionally, unless otherwise indicated, when reference is made to a general figure number, it will be understood to refer to all of the individual figures of that figure family. For example, if a reference is made to FIG. 3, it will be understood to refer to all of the figures that comprise FIG. 3, namely FIG. 3A through FIG. 3F. Further, if a reference is made to FIG. n, where n=A, B, C, D, E, F, it will be understood to refer to all of the figures that comprise FIG. n, from FIG. 3 to FIG. 9, thus excluding FIGS. 1 and 2. For example, any reference to FIG. A, would be understood to mean FIGS. 3A, 4A, 5A, 6A, 7A, 7A, 8A, and 9A.

As will be described in more detail hereinafter, FIGS. 3-9 illustrate a reaction washer 30, 40, 50, 60, 70, 80, 90 in graphic form. Notably, an outer diameter or perimeter of the reaction washer can be round or non-round in shape. Possible non-round shapes for the reaction washer schematically shown in FIGS. A, B, C, D, E, F.

With attention once again to FIG. 1, the reaction washer 30, 40, 50, 60, 70, 80, 90 can be slid onto a free end 112*a* of a threaded element 112 so as to engage a mating face 114*a* of a flange 114. Further, a nut 116 can threadably engage the threaded element 112 so as to capture the reaction washer 30, 40, 50, 60, 70, 80, 90 on the threaded element 112 between the nut 116 and the mating face 114*a* of the flange 114. Thus, the reaction washer 30, 40, 50, 60, 70, 80, 90 is disposed on the threaded element 112 so that the nut 116 is between the reaction washer 30, 40, 50, 60*m* 70, 80, 90 and the free end 112*a* of the threaded element 112 so as to engage a tool 118.

As will be described in more detail hereinafter, features of the reaction washer 30, 40, 50, 60, 70, 80, 90 can prevent rotation of the reaction washer 30, 40, 50, 60, 70, 80, 90 about the threaded element 112 by engaging the mating face 114*a* of the flange 114, thereby allowing the tool 118 to solely rotate the nut 116 without the entirety of the tool 118 rotating about the threaded element 112.

More particularly, the tool 118 can simultaneously and circumferentially engage the nut 116 and the reaction washer 30, 40, 50, 60, 70, 80, 90 by at least partially radially surround the nut 116 and the reaction washer 30, 40, 50, 60, 70, 80, 90. For example, a socket 118*a* of the tool 118 can engage the nut 116 such that the socket 118*a* and the nut 116 rotate as one assembly.

Further, as will be described in more detail hereinafter, an engagement element 118*b* of the tool 118 can engage a tool engagement portion (e.g., perimeter 30*c*, 40*c*, 50*c*, 60*c*, 70*c*, 80*c*, 90*c*) of the reaction washer 30, 40, 50, 60, 70, 80, 90 such that the reaction washer 30, 40, 50, 60, 70, 80, 90 does not rotate with respect to the nut 116. Notably, the engagement element 118*b* of the tool 118 is shown in schematic form in FIG. 1. As will be appreciated, the engagement element 118*b* can be shaped so as to engage the reaction washer 30, 40, 50, 60, 70, 80, 90 and prevent rotation therebetween.

Thus, the tool 118 can be utilized to tighten or loosen the nut 116. As will be appreciated, this means that the nut 116 would travel along the threaded element 112 away from the flange 114 (or toward the free end 112*a*) when the nut 116 is being loosened so that the nut 116 could be removed from the threaded element 112 and the nut 116 would travel along the threaded element 112 away from the free end 112*a* (or toward the mating face 114*a* of the flange 114) when the associated threaded element 112 is being tightened so that the nut 116 cannot be removed from the threaded element 112.

Figure 2A:
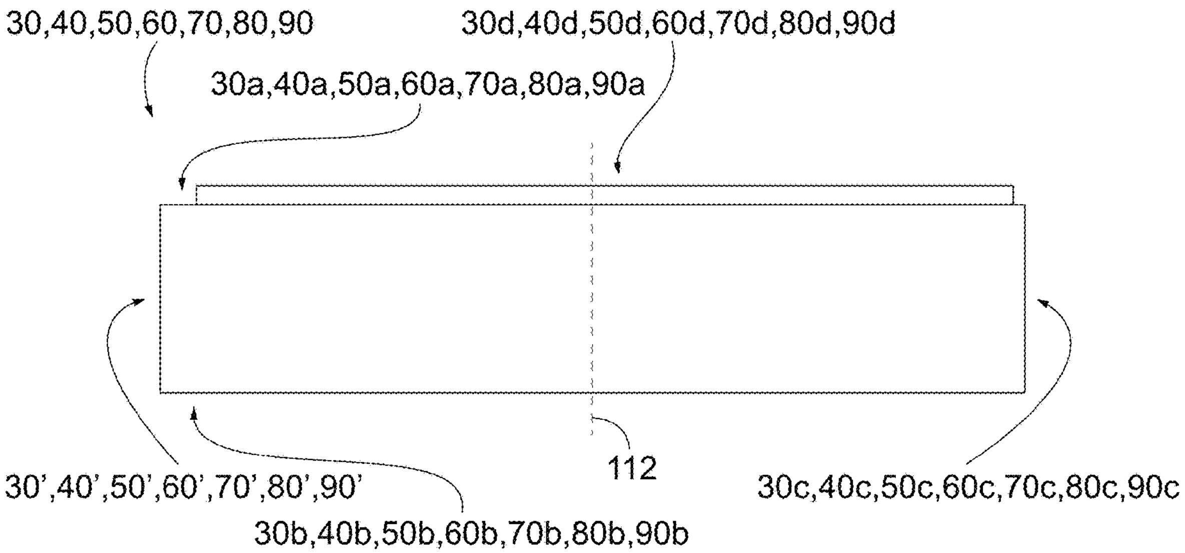
FIG. 2A is an elevation view of a reaction washer in general schematic format.
Figure 2B:
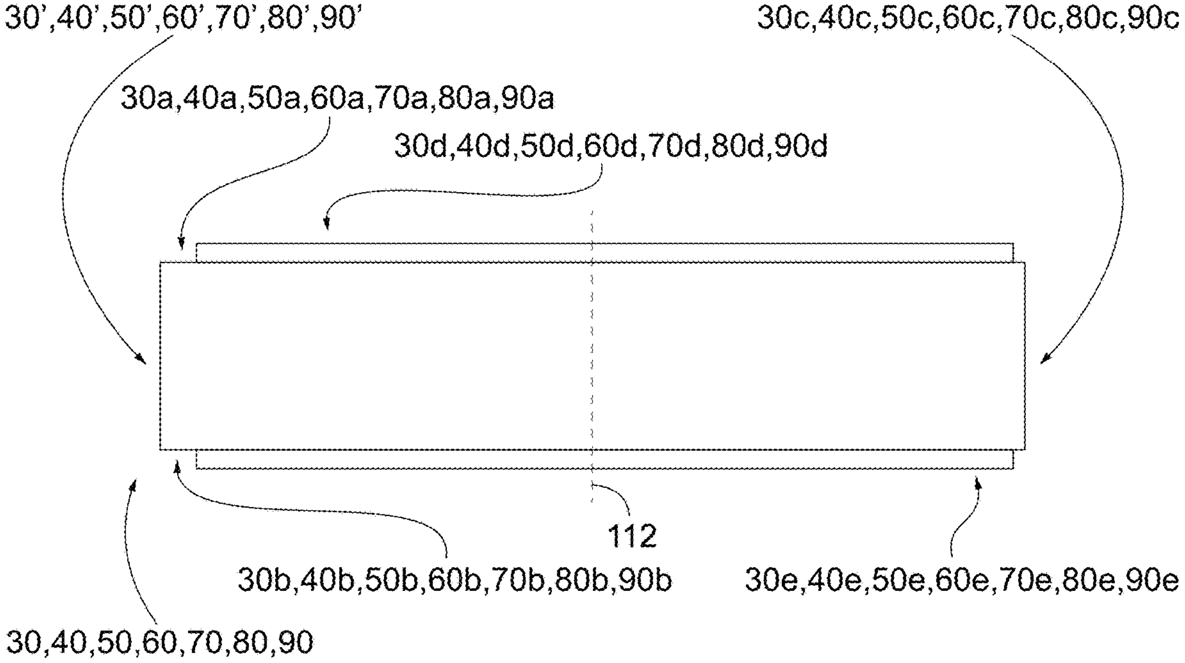
FIG. 2B is an elevation view of a reaction washer in general schematic format.
Figure 3A:
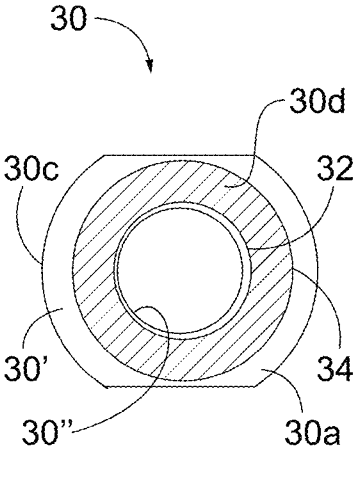
FIG. 3A is a reaction washer with a circular perimeter with multiple clipped portions that includes a friction inducing surface with an off axis single heavy knurl slanted feature.
Figure 3B:
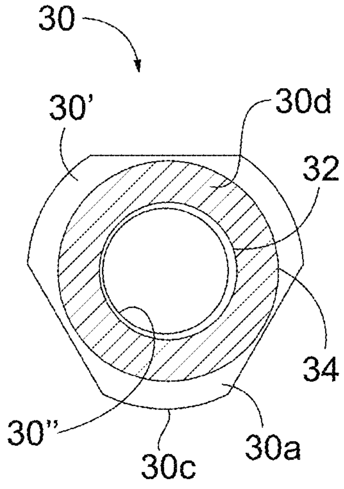
FIG. 3B is a reaction washer with a triangular perimeter with rounded corners that includes a friction inducing surface with an off axis single heavy knurl slanted feature.
Figure 3C:
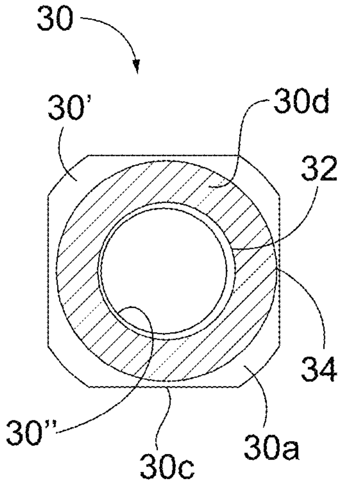
FIG. 3C is a reaction washer with a square perimeter with rounded corners that includes a friction inducing surface with an off axis single heavy knurl slanted feature.
Figure 3D:
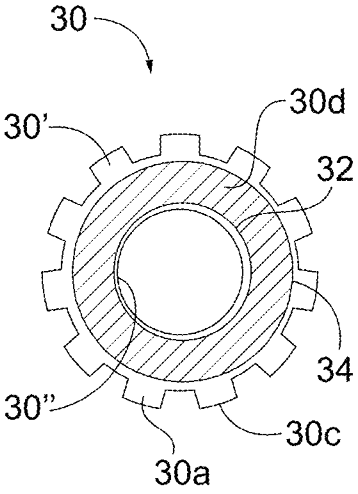
FIG. 3D is a reaction washer with a gear-tooth perimeter in which the top lands match a radius of curvature of the bottom lands that includes a friction inducing surface with an off axis single heavy knurl slanted feature.
Figure 3E:
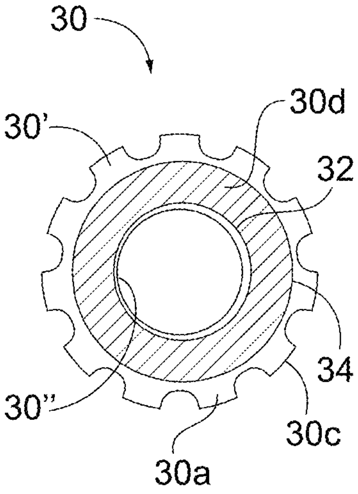
FIG. 3E is a reaction washer with a gear-tooth perimeter in which the bottom lands are concave that includes a friction inducing surface with an off axis single heavy knurl slanted feature.
Figure 3F:
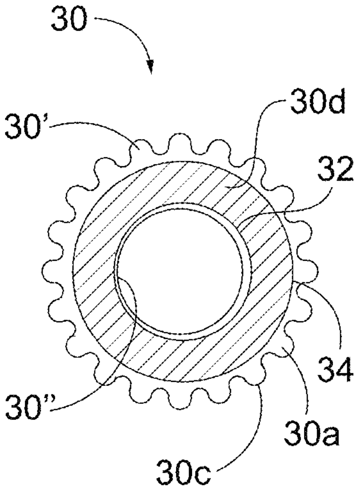
FIG. 3F is a reaction washer with a gear-tooth perimeter in which the top lands are convex and the bottom lands are concave that includes a friction inducing surface with an off axis single heavy knurl slanted feature.
Figure 4A:
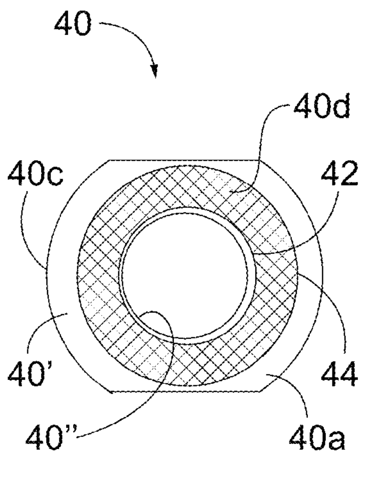
FIG. 4A is a reaction washer with a circular perimeter with multiple clipped portions that includes a friction inducing surface with an off axis more than one heavy knurl slanted feature.
Figure 4B:
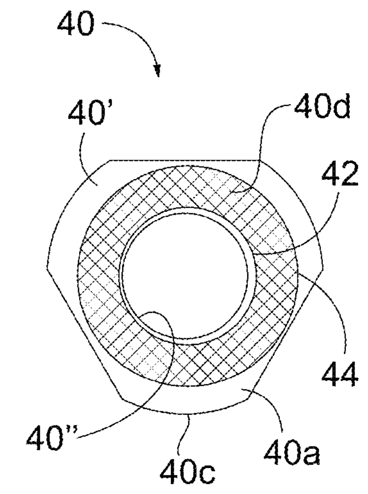
FIG. 4B is a reaction washer with a triangular perimeter with rounded corners that includes a friction inducing surface with an off axis more than one heavy knurl slanted feature.
Figure 4C:
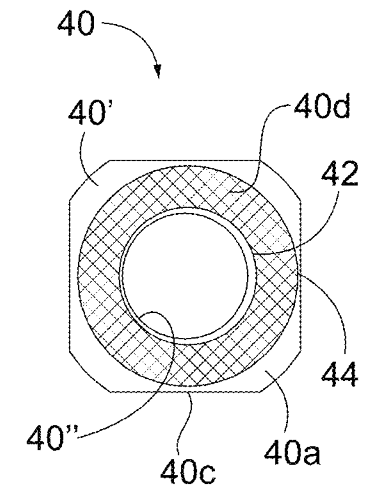
FIG. 4C is a reaction washer with a square perimeter with rounded corners that includes a friction inducing surface with an off axis more than one heavy knurl slanted feature.
Figure 4D:
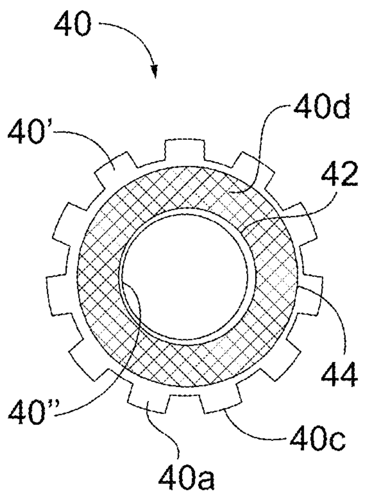
FIG. 4D is a reaction washer with a gear-tooth perimeter in which the top lands match a radius of curvature of the bottom lands that includes a friction inducing surface with an off axis more than one heavy knurl slanted feature.
Figure 4E:
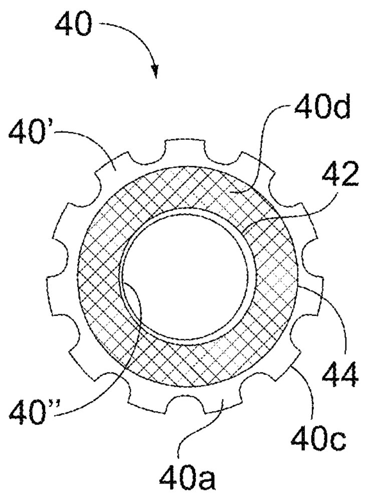
FIG. 4E is a reaction washer with a gear-tooth perimeter in which the bottom lands are concave that includes a friction inducing surface with an off axis more than one heavy knurl slanted feature.
Figure 4F:
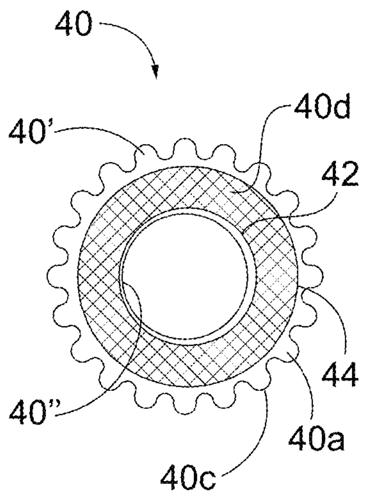
FIG. 4F is a reaction washer with a gear-tooth perimeter in which the top lands are convex and the bottom lands are concave that includes a friction inducing surface with an off axis more than one heavy knurl slanted feature.
Figure 5A:
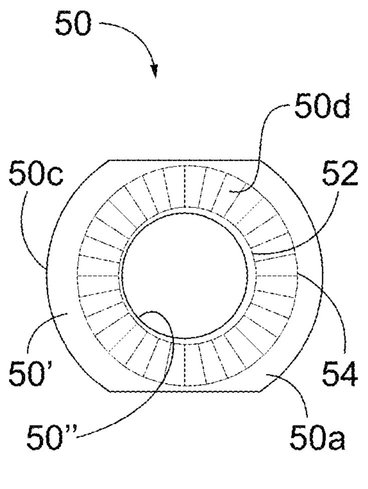
FIG. 5A is a reaction washer with a circular perimeter with multiple clipped portions that includes a friction inducing surface with off axis helical ramps feature.
Figure 5B:
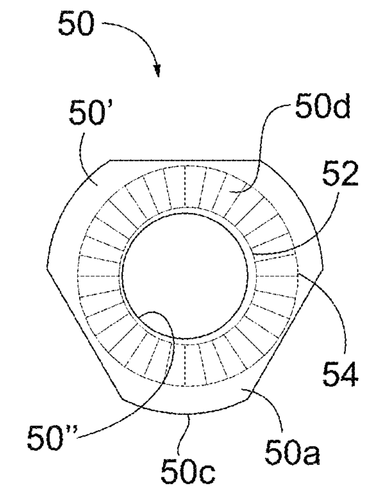
FIG. 5B is a reaction washer with a triangular perimeter with rounded corners that includes a friction inducing surface with off axis helical ramps feature.
Figure 5C:
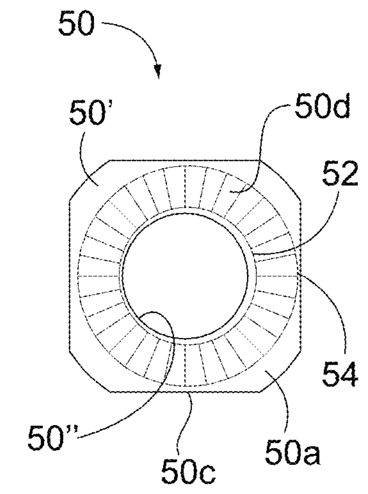
FIG. 5C is a reaction washer with a square perimeter with rounded corners that includes a friction inducing surface with off axis helical ramps feature.
Figure 5D:
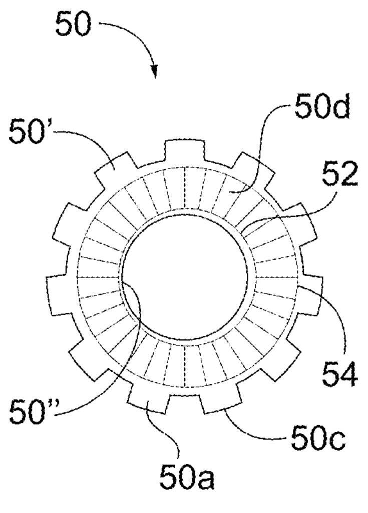
FIG. 5D is a reaction washer with a gear-tooth perimeter in which the top lands match a radius of curvature of the bottom lands that includes a friction inducing surface with off axis helical ramps feature.
Figure 5E:
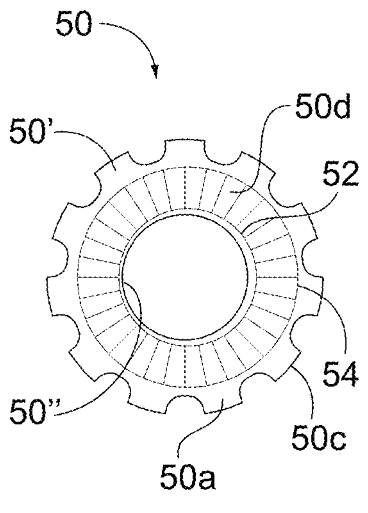
FIG. 5E is a reaction washer with a gear-tooth perimeter in which the bottom lands are concave that includes a friction inducing surface with off axis helical ramps feature.
Figure 5F:
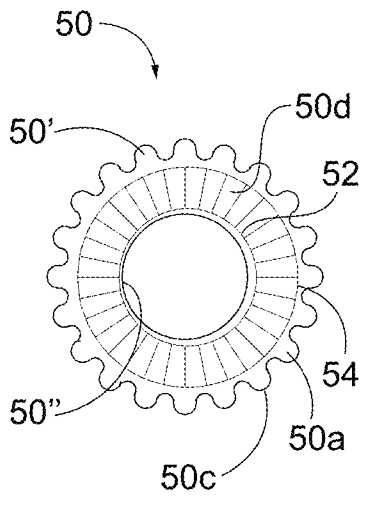
FIG. 5F is a reaction washer with a gear-tooth perimeter in which the top lands are convex and the bottom lands are concave that includes a friction inducing surface with off axis helical ramps feature.
Figure 6A:
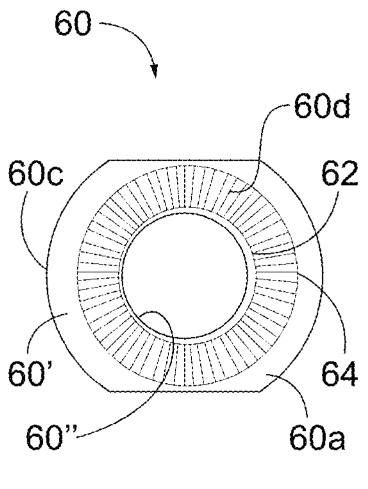
FIG. 6A is a reaction washer with a circular perimeter with multiple clipped portions that includes a friction inducing surface with an off axis radially extending knurl or "V" shaped notches feature.
Figure 6B:
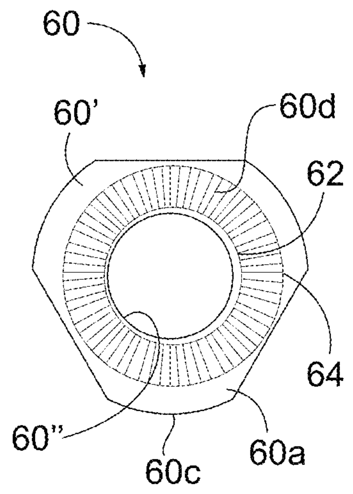
FIG. 6B is a reaction washer with a triangular perimeter with rounded corners that includes a friction inducing surface with an off axis radially extending knurl or "V" shaped notches feature.
Figure 6C:
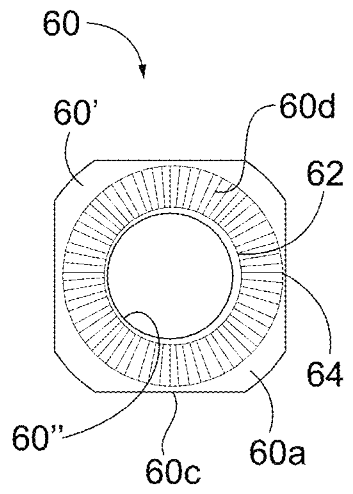
FIG. 6C is a reaction washer with a square perimeter with rounded corners that includes a friction inducing surface with an off axis radially extending knurl or "V" shaped notches feature.
Figure 6D:
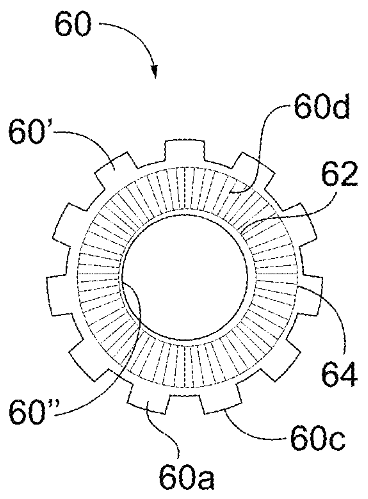
FIG. 6D is a reaction washer with a gear-tooth perimeter in which the top lands match a radius of curvature of the bottom lands that includes a friction inducing surface with an off axis radially extending knurl or "V" shaped notches feature.
Figure 6E:
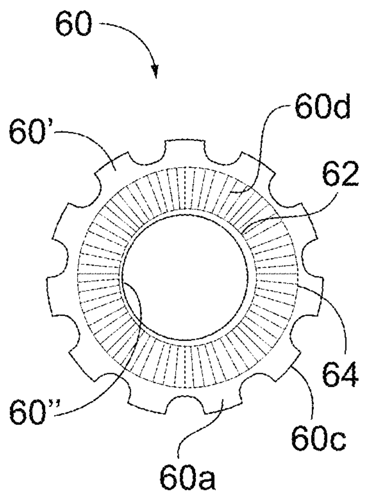
FIG. 6E is a reaction washer with a gear-tooth perimeter in which the bottom lands are concave that includes a friction inducing surface with an off axis radially extending knurl or "V" shaped notches feature.
Figure 6F:
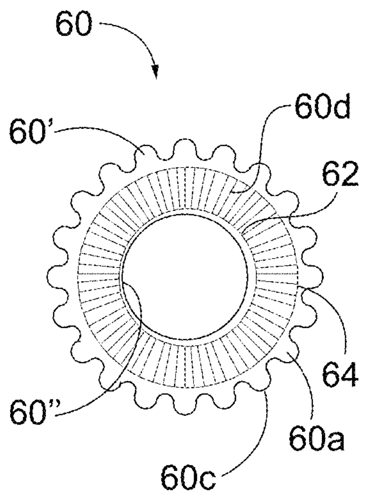
FIG. 6F is a reaction washer with a gear-tooth perimeter in which the top lands are convex and the bottom lands are concave that includes a friction inducing surface with an off axis radially extending knurl or "V" shaped notches feature.
Figure 7A:
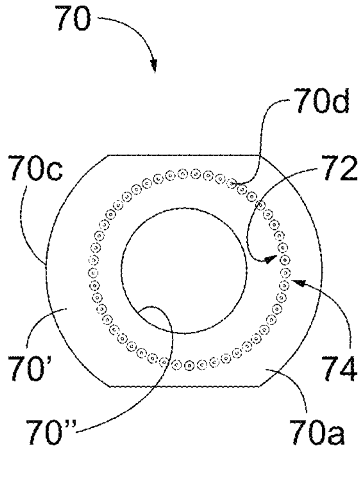
FIG. 7A is a reaction washer with a circular perimeter with multiple clipped portions that includes a friction inducing surface with an off axis radial displaced spikes feature.
Figure 7B:
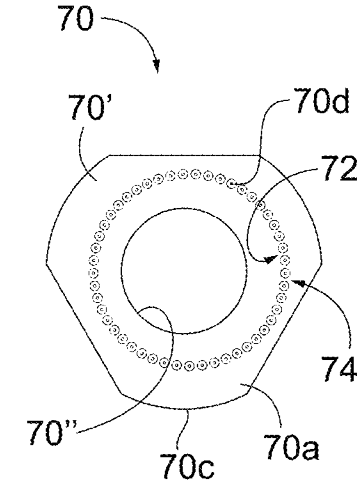
FIG. 7B is a reaction washer with a triangular perimeter with rounded corners that includes a friction inducing surface with an off axis radial displaced spikes feature.
Figure 7C:
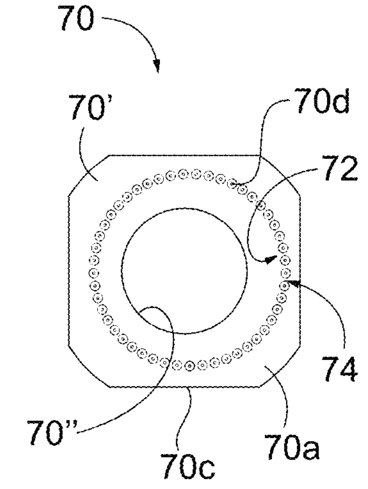
FIG. 7C is a reaction washer with a square perimeter with rounded corners that includes a friction inducing surface with an off axis radial displaced spikes feature.
Figure 7D:
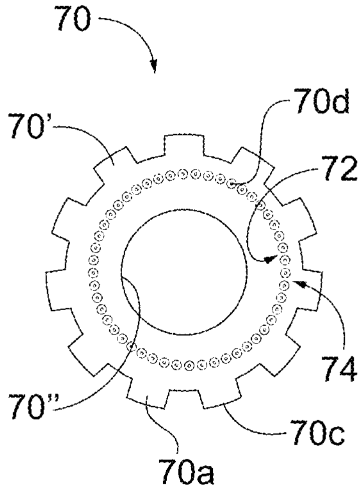
FIG. 7D is a reaction washer with a gear-tooth perimeter in which the top lands match a radius of curvature of the bottom lands that includes a friction inducing surface with an off axis radial displaced spikes feature.
Figure 7E:
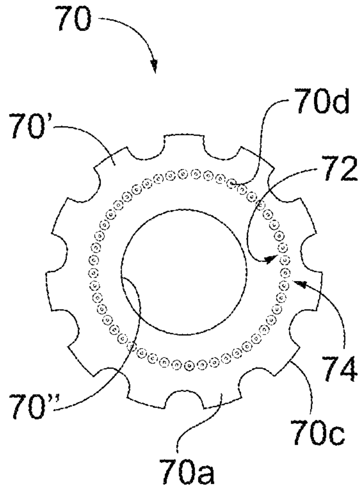
FIG. 7E is a reaction washer with a gear-tooth perimeter in which the bottom lands are concave that includes a friction inducing surface with an off axis radial displaced spikes feature.
Figure 7F:
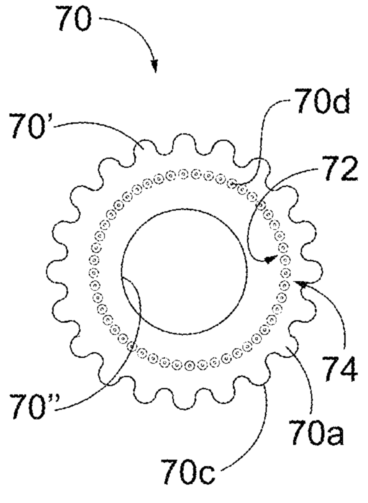
FIG. 7F is a reaction washer with a gear-tooth perimeter in which the top lands are convex and the bottom lands are concave that includes a friction inducing surface with an off axis radial displaced spikes feature.
Figure 8A:
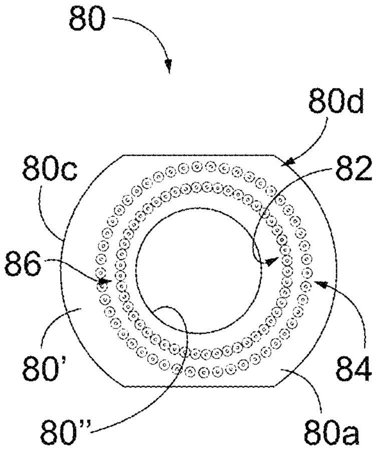
FIG. 8A is a reaction washer with a circular perimeter with multiple clipped portions that includes a friction inducing surface with a more than one ring of off axis radial displaced spikes feature.
Figure 8B:
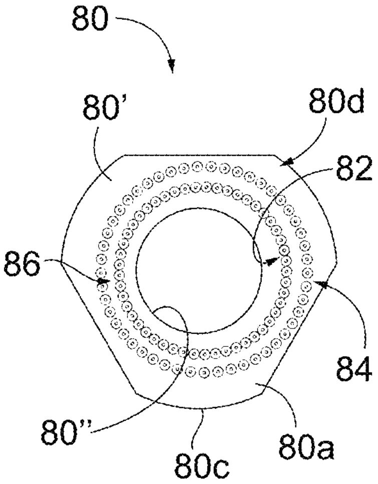
FIG. 8B is a reaction washer with a triangular perimeter with rounded corners that includes a friction inducing surface with a more than one ring of off axis radial displaced spikes feature.
Figure 8C:
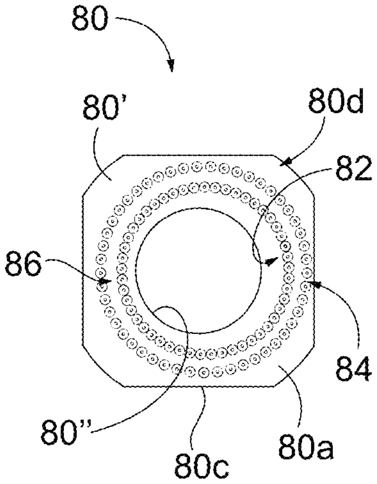
FIG. 8C is a reaction washer with a square perimeter with rounded corners that includes a friction inducing surface with a more than one ring of off axis radial displaced spikes feature.
Figure 8D:
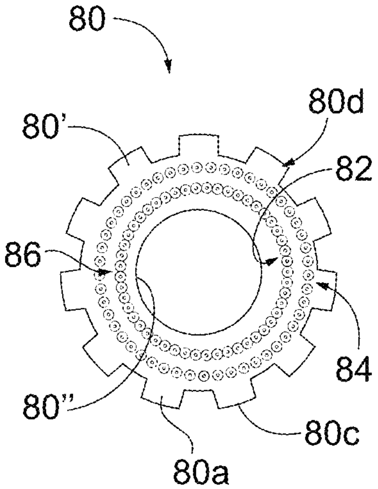
FIG. 8D is a reaction washer with a gear-tooth perimeter in which the top lands match a radius of curvature of the bottom lands that includes a friction inducing surface with a more than one ring of off axis radial displaced spikes feature.
Figure 8E:
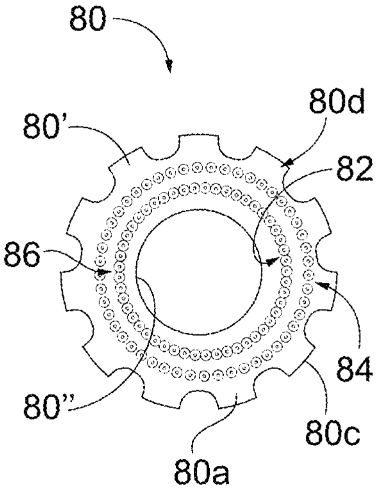
FIG. 8E is a reaction washer with a gear-tooth perimeter in which the bottom lands are concave that includes a friction inducing surface with a more than one ring of off axis radial displaced spikes feature.
Figure 8F:
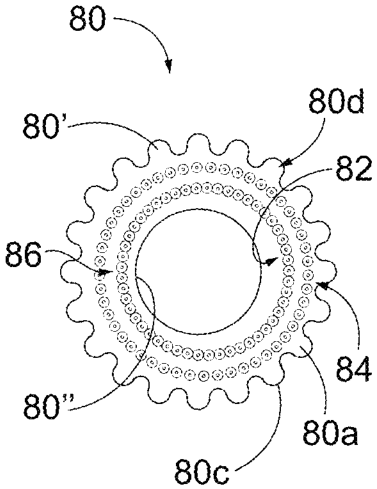
FIG. 8F is a reaction washer with a gear-tooth perimeter in which the top lands are convex and the bottom lands are concave that includes a friction inducing surface with a more than one ring of off axis radial displaced spikes feature.
Figure 9A:
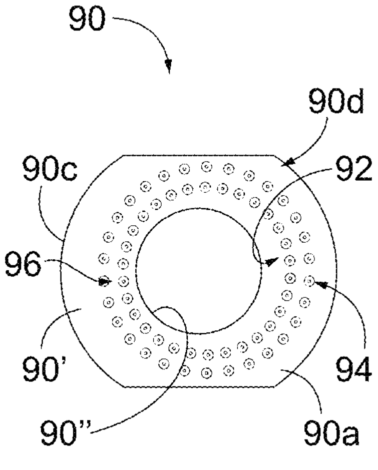
FIG. 9A is a reaction washer with a circular perimeter with multiple clipped portions that includes a friction inducing surface with a two rings of off axis radial displaced spikes feature.
Figure 9B:
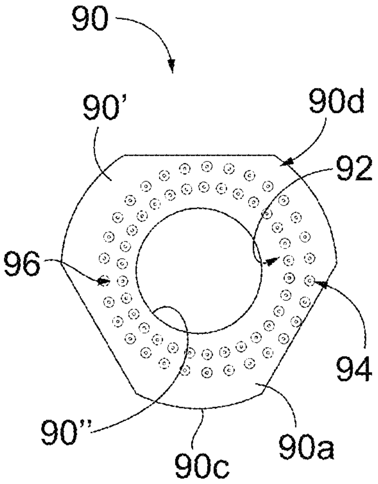
FIG. 9B is a reaction washer with a triangular perimeter with rounded corners that includes a friction inducing surface with a two rings of off axis radial displaced spikes feature.
Figure 9C:
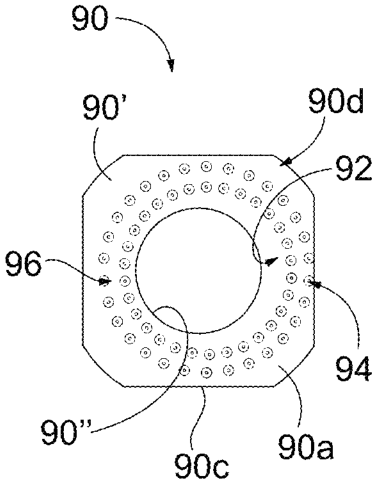
FIG. 9C is a reaction washer with a square perimeter with rounded corners that includes a friction inducing surface with a two rings of off axis radial displaced spikes feature.
Figure 9D:
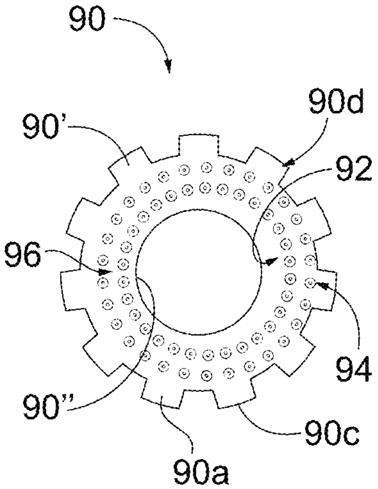
FIG. 9D is a reaction washer with a gear-tooth perimeter in which the top lands match a radius of curvature of the bottom lands that includes a friction inducing surface with a two rings of off axis radial displaced spikes feature.
Figure 9E:
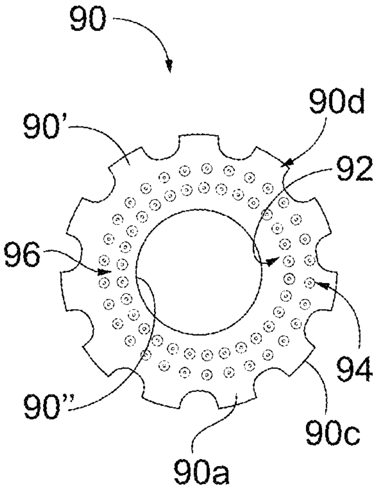
FIG. 9E is a reaction washer with a gear-tooth perimeter in which the bottom lands are concave that includes a friction inducing surface with a two rings of off axis radial displaced spikes feature.
Figure 9F:
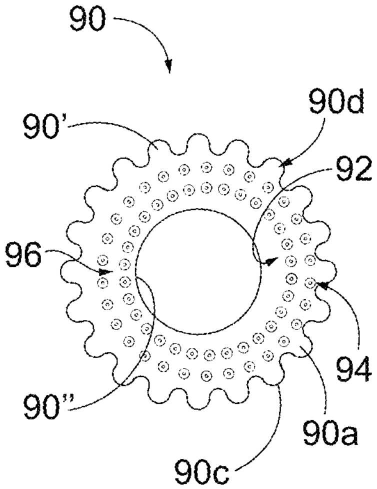
FIG. 9F is a reaction washer with a gear-tooth perimeter in which the top lands are convex and the bottom lands are concave that includes a friction inducing surface with a two rings of off axis radial displaced spikes feature.

Attention is now drawn to FIGS. 2A and 2B, which also illustrate the reaction washer 30, 40, 50, 60, 70, 80, 90 in schematic form. In particular, FIG. 2A illustrates a reaction washer 30, 40, 50, 60, 70, 80, 90 that has a first raised friction inducing surface 30*d*, 40*d*, 50*d*, 60*d*, 70*d*, 80*d*, 90*d*, which are also explicitly shown in FIGS. 3-9. FIG. 2B illustrates a reaction washer 30, 40, 50, 60, 70, 80, 90 that has a first raised friction inducing surface 30*d*, 40*d*, 50*d*, 60*d*, 70*d*, 80*d*, 90*d* and also a second raised friction inducing surface 30*e*, 40*e*, 50*e*, 60*e*, 70*e*, 80*e*, 90*e*. As is considered apparent, FIG. 2 schematically illustrates that the first raised friction inducing surface 30*d*, 40*d*, 50*d*, 60*d*, 70*d*, 80*d*, 90*d* and the second raised friction inducing surface 30*e*, 40*e*, 50*e*, 60*e*, 70*e*, 80*e*, 90*e* are nonconcentric with respect to the rotation axis 112*b*.

In particular, FIGS. 3-9 illustrate the various shapes and types of raised friction inducing surfaces that are possible and contemplated. Thus, when FIGS. 3-9 are viewed in combination with FIGS. 2A-2B, it will be understood that the raised friction inducing surfaces and shapes illustrated in FIGS. 3-9 could incorporated into either a single or double sided reaction washer.

The reaction washer 30, 40, 50, 60, 70, 80, 90 can include a main body 30', 40', 50', 60', 70', 80', 90' that defines an inner diameter 30", 40", 50", 60", 70", 80", 90" that slidingly receives an associated threaded element therethrough so as to define a rotation axis 112*b*. The main body 30', 40', 50', 60', 70', 80', 90' of the reaction washer 30, 40, 50, 60, 70, 80, 90 can include two planer faces, (i.e., a top surface 30*a*, 40*a*, 50*a*, 60*a*, 70*a*, 80*a*, 90*a* and a bottom surface 30*b*, 40*b*, 50*b*, 60*b*, 70*b*, 80*b*, 90*b*) that can face in opposite directions to one another.

Further, the main body 30', 40', 50', 60', 70', 80', 90' defines a perimeter 30*c*, 40*c*, 50*c*, 60*c*, 70*c*, 80*c*, 90*c* that is radially spaced from the inner diameter a variable distance based upon the angular orientation about the rotation axis 112*b* and a radial distance between the perimeter 30*c*, 40*c*, 50*c*, 60*c*, 70*c*, 80*c*, 90*c* and the rotation axis 112*b* varies based upon an angular orientation about the rotation axis 112*b*. Further still, the inner diameter 30", 40", 50", 60", 70", 80", 90" can be radially spaced from the rotation axis 112*b* so as to define a radial perimeter distance that is a constant distance at all angular orientations about the rotation axis 112*b*.

As is considered apparent, FIGS. 3-9 illustrate a reaction washer that defines a non-round perimeter. Further, the inner diameter 30", 40", 50", 60", 70", 80", 90" can be radially spaced from the rotation axis 112*b* a constant distance at all angular orientations about the rotation axis 112*b*. With attention once again to FIGS. 1-9, the reaction washer 30, 40, 50, 60, 70, 80, 90 can include the tool engagement portion on the perimeter (e.g., outer diameter 30*c*, 40*c*, 50*c*, 60*c*, 70*c*, 80*c*, 90*c*) that extends between the top surface 30*a*, 40*a*, 50*a*, 60*a*, 70*a*, 80*a*, 90*a* and the bottom surface 30*b*, 40*b*, 50*b*, 60*b*, 70*b*, 80*b*, 90*b*.

Notably, the reaction washer 30, 40, 50, 60, 70, 80, 90 that is shown in FIGS. 3-9 can be engaged by friction inducing reaction sockets 118*b* so as to overcome rotational movement. Thus, the perimeter 30*c*, 40*c*, 50*c*, 60*c*, 70*c*, 80*c*, 90*c* defines a polygon configured for positive attachment to an associated receiving element so as to inhibit rotation between the reaction washer 30, 40, 50, 60, 70, 80, 90 and the associated receiving element.

The reaction washer 30, 40, 50, 60, 70, 80, 90 can also include the first raised friction inducing surface 30*d*, 40*d*, 50*d*, 60*d*, 70*d*, 80*d*, 90*d* extending from one of the top surface 30*a*, 40*a*, 50*a*, 60*a*, 70*a*, 80*a*, 90*a* and the bottom surface 30*b*, 40*b*, 50*b*, 60*b*, 70*b*, 80*b*, 90*b* so as to be nonconcentric with respect to the rotation axis 112*b*. For clarity, this is shown schematically in FIG. 2 and graphically in FIGS. 3-9.

Further, the first raised friction inducing surface 30*d*, 40*d*, 50*d*, 60*d*, 70*d*, 80*d*, 90*d* can be disposed in a circular pattern so as to define an inner friction diameter 32, 42, 52, 62, 72, 82, 92 and an outer friction diameter 34, 44, 54, 64, 74, 84, 94. As shown in FIGS. 8-9, the first raised friction inducing surface 80*d*, 90*d* can also define a middle friction diameter 86, 96. The middle friction diameter 86, 96 can be coaxially disposed between the inner friction diameter 82, 92 and the outer friction diameter 84, 94. Further, a radial distance between the middle friction diameter 86, 96 and the rotation axis 112*b* varies based upon an angular orientation about the rotation axis 112*b*.

FIG. A illustrate the reaction washer 30, 40, 50, 60, 70, 80, 90 with a circular perimeter 30*c*, 40*c*, 50*c*, 60*c*, 70*c*, 80*c*, 90*c*. FIG. B illustrate the reaction washer 30, 40, 50, 60, 70, 80, 90 with a triangular perimeter 30*c*, 40*c*, 50*c*, 60*c*, 70*c*, 80*c*, 90*c*. FIG. C illustrate the reaction washer 30, 40, 50, 60, 70, 80, 90 with a square perimeter 30*c*, 40*c*, 50*c*, 60*c*, 70*c*, 80*c*, 90*c*.

FIG. D illustrate the reaction washer 30, 40, 50, 60, 70, 80, 90 with a gear-tooth perimeter 30*c*, 40*c*, 50*c*, 60*c*, 70*c*, 80*c*, 90*c*. FIG. E illustrate the reaction washer 30, 40, 50, 60, 70, 80, 90 with a gear-tooth perimeter 30*c*, 40*c*, 50*c*, 60*c*, 70*c*, 80*c*, 90*c*. FIG. F illustrate the reaction washer 30, 40, 50, 60, 70, 80, 90 with a gear-tooth perimeter 30*c*, 40*c*, 50*c*, 60*c*, 70*c*, 80*c*, 90*c*.

FIG. 3 illustrate the reaction washer 30 that includes a friction inducing surface 30*d* with an off axis single heavy knurl slanted feature. FIG. 4 illustrate the reaction washer 40 that includes friction inducing surface 40*d* with an off axis more than one heavy knurl slanted feature. FIG. 5 illustrate the reaction washer 50 that includes a friction inducing surface 50*d* with off axis helical ramps feature. FIG. 6 illustrate the reaction washer 60 that includes a friction inducing surface 60*d* with an off axis radially extending knurl or "V" shaped notches feature.

FIG. 7 illustrate the reaction washer 70 that includes a friction inducing surface 70*d* with an off axis radial displaced spikes feature. FIG. 8 illustrate the reaction washer 80 that includes a friction inducing surface 80*d* with a more than one ring of off axis radial displaced spikes feature. FIG. 9 illustrate the reaction washer 90 that includes a friction inducing surface 90*d* with a two rings of off axis radial displaced spikes feature.

A radial distance between the inner friction diameter 32, 42, 52, 62, 72, 82, 92 and the rotation axis 112*b* can vary based upon an angular orientation about the rotation axis 112*b*. Further, a radial distance between the rotation axis 112*b* and the outer friction diameter 34, 44, 54, 64, 74, 84, 94 defines a radial friction diameter distance and the radial perimeter distance is greater than the radial friction diameter distance at a same angular position about the rotation axis 112*b*.

A radial distance between the outer friction diameter 34, 44, 54, 64, 74, 84, 94 and the rotation axis 112*b* can also vary based upon an angular orientation about the rotation axis 112*b*. Further, a radial distance between the rotation axis 112*b* and the outer friction diameter 34, 44, 54, 64, 74, 84, 94 can be greater than a radial distance between the rotation axis 112*b* and the inner friction diameter 32, 42, 52, 62, 72, 82, 92.

Additionally, the radial distance between the rotation axis 112*b* and the outer friction diameter 84, 94 is greater than a radial distance between the rotation axis 112*b* and the middle friction diameter 86, 96. Further still, the radial distance between the rotation axis 112*b* and the middle friction diameter 86, 96 can be greater than the radial distance between the rotation axis 112*b* and the inner friction diameter 82, 92.

As illustrated in FIGS. 3-9, the first raised friction inducing surface 30*d*, 40*d*, 50*d*, 60, 70*d*, 80*d*, 90*d* extends from the top surface 30*a*, 40*a*, 50*a*, 60*a*, 70*a*, 80*a*, 90*a*, as schematically illustrated in FIG. 2A. However, it will be understood that the first raised friction inducing surface 30*d*, 40*d*, 50*d*, 60, 70*d*, 80*d*, 90*d* could extend from the bottom surface 30*b*, 40*b*, 50*b*, 60*b*, 70*b*, 80*b*, 90*b* without departing from the scope of this disclosure.

Further, it is noted that the first raised friction inducing surface 30*d*, 40*d*, 50*d*, 60*d*, 70*d*, 80*d*, 90*d* can define a first coefficient of friction. The coefficient of friction of the first raised friction inducing surface 30*d*, 40*d*, 50*d*, 60*d*, 70*d*, 80*d*, 90*d* can be greater than a coefficient of friction of either of the top surface 30*a*, 40*a*, 50*a*, 60*a*, 70*a*, 80*a*, 90*a* and the bottom surface 30*b*, 40*b*, 50*b*, 60*b*, 70*b*, 80*b*, 90*b*.

When viewing FIGS. 3-9, in concert with FIG. 2B, it is understood that the first raised friction inducing surface 30*d*, 40*d*, 50*d*, 60*d*, 70*d*, 80*d*, 90*d* can extend from the top surface 30*a*, 40*a*, 50*a*, 60*a*, 70*a*, 80*a*, 90*a* and a second raised friction inducing surface 30*e*, 40*e*, 50*e*, 60*e*, 70*e*, 80*e*, 90*e* can extend from the bottom surface 30*b*, 40*b*, 50*b*, 60*b*, 70*b*, 80*b*, 90*b*. The second raised friction inducing surface 30*e*, 40*e*, 50*e*, 60*e*, 70*e*, 80*e*, 90*e* can define a second coefficient of friction.

When the reaction washer 30, 40, 50, 60, 70, 80, 90 includes the second raised friction inducing surface 30*e*, 40*e*, 50*e*, 60*e*, 70*e*, 80*e*, 90*e* and the first raised friction inducing surface 30*d*, 40*d*, 50*d*, 60*d*, 70*d*, 80*d*, 90*d*, the first coefficient of friction can be greater than the second coefficient of friction. Further, the first raised friction inducing surface 30*d*, 40*d*, 50*d*, 60*d*, 70*d*, 80*d*, 90*d* can include a plurality of protrusions extending from the top surface 30*a*, 40*a*, 50*a*, 60*a*, 70*a*, 80*a*, 90*a* in a direction away from the bottom surface 30*b*, 40*b*, 50*b*, 60*b*, 70*b*, 80*b*, 90*b* so as to prevent rotation of the reaction washer 30, 40, 50, 60, 70, 80, 90 about the rotation axis 112*b* when the protrusions contact another surface.

This provides for inhibited rotation of the reaction washer 30, 40, 50, 60, 70, 80, 90 against a flange type surface, such as when a threaded fastener (e.g., nut 116 or bolt head) is turned against the top surface 30*a*, 40*a*, 50*a*, 60*a*, 70*a*, 80*a*, 90*a*. This ensures that the threaded fastener will turn on the second raised friction inducing surface 20*e*, 30*e*, 40*e*, 50*e*, 60*e*, 70*e*, 80*e*, 90*e* without inducing rotation of the reaction washer 20, 30, 40, 50, 60, 70, 80, 90 relative to the first raised friction inducing surface 20*d*, 30*d*, 40*d*, 50*d*, 60*d*, 70*d*, 80*d*, 90*d* of the bottom surface 20*b*, 30*b*, 40*b*, 50*b*, 60*b*, 70*b*, 80*b*, 90*b* of the reaction washer 20, 30, 40, 50, 60, 70, 80, 90.

The first raised friction inducing surface 30*d*, 40*d*, 50*d*, 60*d*, 70*d*, 80*d*, 90*d*, and the second raised friction inducing surface 20*e*, 30*e*, 40*e*, 50*e*, 60*e*, 70*e*, 80*e*, 90*e* can each extend from the bottom surface 20*b*, 30*b*, 40*b*, 50*b*, 60*b*, 70*b*, 80*b*, 90*b* or top surface 30*a*, 40*a*, 50*a*, 60*a*, 70*a*, 80*a*, 90*a*, respectively, in a perpendicular direction with a zero taper or angle with respect to the bottom surface 30*b*, 40*b*, 50*b*, 60*b*, 70*b*, 80*b*, 90*b* or the top surface 30*a*, 40*a*, 50*a*, 60*a*, 70*a*, 80*a*, 90*a*, respectively.

Further, the first raised friction inducing surface 30*d*, 40*d*, 50*d*, 60*d*, 70*d*, 80*d*, 90*d* and the second raised friction inducing surface 30*e*, 40*e*, 50*e*, 60*e*, 70*e*, 80*e*, 90*e* can each extend by at least 0.005 of an inch from the bottom surface 30*b*, 40*b*, 50*b*, 60*b*, 70*b*, 80*b*, 90*b* or the top surface 30*a*, 40*a*, 50*a*, 60*a*, 70*a*, 80*a*, 90*a*, respectively, of the reaction washer 30, 40, 50, 60, 70, 80, 90.

As shown in the figures, the reaction washer 30, 40, 50, 60, 70, 80, 90 may have one or both of the friction inducing surfaces 30*d*, 40*d*, 50*d*, 60*d*, 70*d*, 80*d*, 90*d*, 30*e*, 40*e*, 50*e*, 60*e*, 70*e*, 80*e*, 90*e* located non-axially aligned with respect the inner diameter 30", 40", 50", 60", 70", 80", 90" of the reaction washer 30, 40, 50, 60, 70, 80, 90. The non-axial location of the friction inducing surface(s) 30*d*, 40*d*, 50*d*, 60*d*, 70*d*, 80*d*, 90*d*, 30*e*, 40*e*, 50*e*, 60*e*, 70*e*, 80*e*, 90*e* can inhibit rotation of the reaction washer 30, 40, 50, 60, 70, 80, 90 by creating a lever action so that the friction inducing surface would have to travel in a non-circular direction to rotate about the rotation axis 112*b*. The offset distance between the inner diameter 30", 40", 50", 60", 70", 80", 90" of the reaction washer 30, 40, 50, 60, 70, 80, 90 and center axis of the friction inducing surfaces can create a torque force proportional to the off-set distances between the inner diameter 30", 40", 50", 60", 70", 80", 90" of the reaction washer 30, 40, 50, 60, 70, 80, 90 and the central axis of the friction inducing surface.

The reaction washer 30, 40, 50, 60, 70, 80, 90 with the first raised friction inducing surface 30*d*, 40*d*, 50*d*, 60*d*, 70*d*, 80*d*, 90*d* being offset on the bottom surface 30*b*, 40*b*, 50*b*, 60*b*, 70*b*, 80*b*, 90*b* can provide for an indexable abutment location on the mating flange surface so that repeated uses of the reaction washer 30, 40, 50, 60, 70, 80, 90 would have undisturbed flange face surfaces to mate against which had not previously been mated to the friction inducing surface.

Additionally, the reaction washer 30, 40, 50, 60, 70, 80, 90 provides an indexing feature so that after the initial washer use, the reaction washer 30, 40, 50, 60, 70, 80, 90 can be rotated so as to grab "fresh" flange area which has not been subjected to the pattern of the friction element. The off-set axis increases the frictional angle of the friction element to provide greater resistance to rotation.

The reaction washer 30, 40, 50, 60, 70, 80, 90 with the second raised friction inducing surface 30*e*, 40*e*, 50*e*, 60*e*, 70*e*, 80*e*, 90*e* extending from the top surface 30*a*, 40*a*, 50*a*, 60*a*, 70*a*, 80*a*, 90*a* can provide for an indexable abutment location of a mating fastener (nut 116 or bolt head) so that the same "fresh" material grab area as the flange is available.

The reaction washers 30, 40, 50, 60, 70, 80, 90 provide numerous advantages due to their previously described design. For example, since the reaction washers 30, 40, 50, 60, 70, 80, 90 are not tapered, washer material is not removed to create a taper. Thus, there is more material to provide friction receiving peripheral mass than if the washer had a taper. Furthermore, since the reaction washers 30, 40, 50, 60, 70, 80, 90 are not prone to damage, as compared to a tapered reaction washer. Thus, the reaction washers 30, 40, 50, 60, 70, 80, 90 can be used multiple times, as compared to the single use application of the tapered reaction washers.

Further still, with the geometry of the reaction washers 30, 40, 50, 60, 70, 80, 90, the abutting material, such as a flange surface is not subjected to deformation within the same area as the abutting friction inducing surface. Thus, repeated use of the reaction washers 30, 40, 50, 60, 70, 80, 90 will not "work harden" the flange or abutment receiving surface. Accordingly, the effectiveness of the reaction washers friction inducing surface(s) is not decreased after each use.

A reaction washer has been described above in particularity. Modifications and alternations will occur to those upon reading and understanding the preceding detail description. The invention, however, is not limited to only the embodiment described above. Instead, the invention is broadly defined by the appended claims and the equivalents thereof.

The invention claimed is:

1. A reaction washer, comprising:

a main body defining an inner diameter that slidingly receives an associated threaded element therethrough so as to define a rotation axis, the main body including a top surface and a bottom surface that face in opposite directions, wherein the reaction washer also includes a first raised friction inducing surface that extends from at least one of the top surface and the bottom surface so as to be nonconcentric with respect to the rotation axis.

2. The reaction washer of claim 1, wherein the first raised friction inducing surface is oriented in a circular pattern so as to define an inner friction diameter and an outer friction diameter, and wherein a radial distance between the rotation axis and the outer friction diameter is greater than a radial distance between the rotation axis and the inner friction diameter.

3. The reaction washer of claim 2, wherein a radial distance between the inner friction diameter and the rotation axis varies based upon an angular orientation about the rotation axis, and wherein a radial distance between the outer friction diameter and the rotation axis varies based upon an angular orientation about the rotation axis.

4. The reaction washer of claim 1, wherein the first raised friction inducing surface defines a coefficient of friction that is greater than a coefficient of friction of either of the top surface and the bottom surface.

5. The reaction washer of claim 1, wherein the main body defines a perimeter that is radially spaced from the inner diameter, and wherein a radial distance between the perimeter and the rotation axis varies based upon an angular orientation about the rotation axis.

6. The reaction washer of claim 1, wherein the first raised friction inducing surface includes a plurality of protrusions extending from the top surface in a direction away from the bottom surface so as to prevent rotation of the reaction washer about the rotation axis when the protrusions contact another surface.

7. The reaction washer of claim 2, wherein the main body defines a perimeter that is radially spaced from the inner diameter, wherein a radial distance between the rotation axis and the perimeter defines a radial perimeter distance and a radial distance between the rotation axis and the outer friction diameter defines a radial friction diameter distance, and wherein the radial perimeter distance is greater than the radial friction diameter distance at a same angular position about the rotation axis.

8. The reaction washer of claim 1, wherein the inner diameter is radially spaced from the rotation axis a constant distance at all angular orientations about the rotation axis and the main body defines a perimeter that is radially spaced from the inner diameter a variable distance based upon the angular orientation about the rotation axis.

9. The reaction washer of claim 8, wherein the perimeter defines a polygon configured for positive attachment to an associated receiving element so as to inhibit rotation between the reaction washer and the associated receiving element.

10. The reaction washer of claim 1, wherein the first raised friction inducing surface also defines a middle friction diameter, and wherein a radial distance between the rotation axis and the outer friction diameter is greater than a radial distance between the rotation axis and the middle friction diameter and a radial distance between the rotation axis and the middle friction diameter is greater than a radial distance between the rotation axis and the inner friction diameter, and wherein the radial distance between the middle friction diameter and the rotation axis varies based upon an angular orientation about the rotation axis.

11. A reaction washer, comprising:

a main body defining an inner diameter that slidingly receives an associated threaded element therethrough so as to define a rotation axis, the main body including a top surface and a bottom surface that face in opposite directions along the rotation axis, wherein the reaction washer also includes a first raised friction inducing surface that extends from at least one of the top surface and the bottom surface, the first raised friction inducing surface being disposed in a circular pattern so as to define an inner friction diameter and an outer friction diameter, wherein a radial distance between the inner friction diameter and the rotation axis varies based upon an angular orientation about the rotation axis, and wherein the main body defines a perimeter that is radially spaced from the inner diameter a variable distance based upon the angular orientation about the rotation axis.

12. The reaction washer of claim 11, wherein a radial distance between the rotation axis and the outer friction diameter is greater than a radial distance between the rotation axis and the inner friction diameter.

13. The reaction washer of claim 11, wherein the first raised friction inducing surface defines a coefficient of friction that is greater than a coefficient of friction of either of the top surface and the bottom surface.

14. The reaction washer of claim 12, wherein a radial distance between the outer friction diameter and the rotation axis varies based upon an angular orientation about the rotation axis.

15. The reaction washer of claim 11, wherein the first raised friction inducing surface includes a plurality of protrusions so as to prevent rotation of the reaction washer about the rotation axis when the protrusions contact another surface.

16. The reaction washer of claim 12, wherein a radial distance between the rotation axis and the perimeter defines a radial perimeter distance and a radial distance between the rotation axis and the outer friction diameter defines a radial friction diameter distance, and wherein the radial perimeter distance is greater than the radial friction diameter distance at a same angular position about the rotation axis.

17. The reaction washer of claim 11, wherein the inner diameter is radially spaced from the rotation axis a constant distance at all angular orientations about the rotation axis.

18. The reaction washer of claim 12, wherein the first raised friction inducing surface also defines a middle friction diameter, and wherein the radial distance between the rotation axis and the outer friction diameter is greater than a radial distance between the rotation axis and the middle friction diameter and the radial distance between the rotation axis and the middle friction diameter is greater than the radial distance between the rotation axis and the inner friction diameter.

19. The reaction washer of claim 18, wherein a radial distance between the middle friction diameter and the rotation axis varies based upon an angular orientation about the rotation axis.

20. The reaction washer of claim 14, wherein the perimeter defines a polygon configured for positive attachment to an associated receiving element so as to inhibit rotation between the reaction washer and the associated receiving element.

* * * * *